US011981337B2

(12) United States Patent
Fermon

(10) Patent No.: US 11,981,337 B2
(45) Date of Patent: May 14, 2024

(54) SMART ROAD INFRASTRUCTURE FOR VEHICLE SAFETY AND AUTONOMOUS DRIVING

(71) Applicant: Israel Fermon, Jerusalem (IL)

(72) Inventor: Israel Fermon, Jerusalem (IL)

( * ) Notice: Subject to any disclaimer, the term of this patent is extended or adjusted under 35 U.S.C. 154(b) by 504 days.

(21) Appl. No.: 17/311,449

(22) PCT Filed: Dec. 10, 2019

(86) PCT No.: PCT/IL2019/051346
§ 371 (c)(1),
(2) Date: Jun. 7, 2021

(87) PCT Pub. No.: WO2020/121300
PCT Pub. Date: Jun. 18, 2020

(65) Prior Publication Data
US 2022/0176976 A1 Jun. 9, 2022

Related U.S. Application Data

(60) Provisional application No. 62/777,791, filed on Dec. 11, 2018.

(51) Int. Cl.
*B60W 40/12* (2012.01)
*B60W 50/00* (2006.01)
(Continued)

(52) U.S. Cl.
CPC ........ *B60W 40/12* (2013.01); *B60W 50/0098* (2013.01); *H04W 4/00* (2013.01);
(Continued)

(58) Field of Classification Search
CPC ............. B60W 40/12; B60W 50/0098; B60W 2552/10; B60W 2552/53; H04W 4/44;
(Continued)

(56) References Cited

U.S. PATENT DOCUMENTS

2009/0115638 A1 5/2009 Shankwitz et al.
2012/0098657 A1 4/2012 Bogatine
(Continued)

FOREIGN PATENT DOCUMENTS

WO 2006/129298 A2 12/2006
WO 2006/129298 A3 12/2006
(Continued)

OTHER PUBLICATIONS

International Search Report for PCT/IL2019/051346, dated Mar. 5, 2020 (4 pages).
(Continued)

*Primary Examiner* — Tyler D Paige
(74) *Attorney, Agent, or Firm* — Roach Brown McCarthy & Gruber, P.C.; Kevin D. McCarthy

(57) ABSTRACT

A system for providing smart road infrastructure for the purpose of vehicle safety and autonomous driving, comprising a plurality of road units, which are located along the borders of each traffic lane and equally spaced from each other, where each road unit includes a read/write passive RF tag; antenna for communicating with a plurality of transceivers, each of which is installed on each vehicle that travels along a traffic lane of said road, in response to signals transmitted from said transceivers; a memory for temporarily storing data regarding each vehicle traveling along said lane. Each car unit comprises a reader for interrogating said tags. The reader includes a first transceiver that is installed on the left front of said vehicle and a second transceiver that is installed on the right front of said vehicle; a processor being in bidirectional data communication with said transceivers and with the vehicle inherent control systems, for processing data received from said tags and calculating speed and location of said vehicle with respect to the borders of said lane and to other neighboring vehicles traveling in
(Continued)

said lane and adjacent lanes, to implement vehicle safety operations such as Lane Departure Warning, Forward Collision Warning, Lane Keeping Assist, Lane Centering, Side Collision Warning. Alerting the driver (visually and/or audibly) regarding potential problems and/or taking over control of the vehicle (ADAS 1-5). The system can provide Connected Vehicles with accurate (ubiquitous and instantaneous) location data with lane-level resolution. The proposed smart infrastructure may complement car sensors and/or connected vehicles, so as to implement a combination that yield the most relabel and cost-effective autonomous driving system.

19 Claims, 16 Drawing Sheets

(51) Int. Cl.
  *H04W 4/00* (2018.01)
  *H04W 4/44* (2018.01)
(52) U.S. Cl.
  CPC .......... *H04W 4/44* (2018.02); *B60W 2552/10* (2020.02); *B60W 2552/53* (2020.02)
(58) Field of Classification Search
  CPC .. H04W 4/80; G01S 7/027; G01S 2013/9316; G01S 2013/9318; G01S 2013/93185; G01S 2013/9319; G01S 2013/9325; G01S 2013/93271; G01S 2013/9329; G01S 13/751; G01S 13/931; G01S 5/0072; G01S 17/931; G01S 19/42; G08G 1/167; G08G 1/02; H01Q 1/2225; H01Q 1/3225; H01Q 1/44; H01Q 9/30; E01C 23/18; E01F 9/30; G01C 21/20
  USPC .............................................................. 701/1
  See application file for complete search history.

(56) References Cited

U.S. PATENT DOCUMENTS

| | | | |
|---|---|---|---|
| 2017/0074964 A1* | 3/2017 | Xu ........................ | G01S 13/74 |
| 2018/0024562 A1* | 1/2018 | Bellaiche .................. | G06T 7/74 |
| | | | 701/26 |
| 2018/0025235 A1* | 1/2018 | Fridman .............. | H04N 13/239 |
| | | | 382/103 |
| 2018/0299895 A1* | 10/2018 | Knotts .................... | H04L 67/12 |
| 2018/0336782 A1 | 11/2018 | Chase et al. | |
| 2022/0176976 A1* | 6/2022 | Fermon ............. | B60W 50/0098 |

FOREIGN PATENT DOCUMENTS

| | | | | |
|---|---|---|---|---|
| WO | 2018/049085 A1 | 3/2018 | | |
| WO | WO-2019173315 A1 * | 9/2019 | ......... | G01C 21/3492 |
| WO | WO-2020121300 A1 * | 6/2020 | ............ | B60W 40/12 |

OTHER PUBLICATIONS

Written Opinion of the International Searching Authority for PCT/IL2019/051346, dated Mar. 5, 2020 (5 pages).

* cited by examiner

A < 30°

Bounced non-Los signals

SMART ROAD INFRASTRUCTURE FOR VEHICLE SAFETY AND AUTONOMOUS DRIVING

FIELD OF THE INVENTION

The present invention relates to the field of vehicle traffic safety and partial or full autonomous driving. More particularly, the invention relates to a novel road infrastructure and system for safely managing vehicles traffic, which is suitable for safe Autonomous Driving.

BACKGROUND OF THE INVENTION

There is substantial anticipation and excitement around the Connected/Automated Vehicles (CAVs). There are two discernable areas of development in CAV technology: one of Autonomous Vehicle (AV) development and one of Connected Vehicle (CV) development. Both technologies are directed to increase the driving safety by relying mostly on automated devices and less on human reactions.

One of the existing solutions for increasing the driving safety are Advanced Driver Assistance Systems (ADAS), which are systems that were developed to automate/adapt/enhance vehicle systems for safety and better driving. Safety features are designed to avoid collisions and accidents by offering technologies that alert the driver regarding potential problems, or to avoid collisions by implementing safeguards and taking over control of the vehicle. The Society of Automotive Engineers (SAE), determines the intelligence level and automation capabilities of vehicles, ranking them in the range from fully manual (Level 0) to fully autonomous (Level 5) capabilities.

Each SAE level 0-5 represents different features as follows:
Level 0: Driver only: the human driver controls everything independently: steering, throttle, brakes, etc.
Level 1: Assisted driving: assistance systems help during vehicle operation, such as Cruise Control and Adaptive Cruise Control (ACC) systems that automatically adjusts the vehicle speed to maintain a safe distance from vehicles ahead.
Level 2: Partial automation: the operator must monitor the system at all times. At least one system, such as cruise control and lane centering, is fully automated.
Level 3: Conditional automation: the operator monitors the system and can intervene when necessary. Safety-critical functions, under certain circumstances, are shifted to the vehicle.
Level 4: High automation: no monitoring by the driver is required. Vehicles are designed to operate safety-critical functions and monitor road conditions for an entire trip. However, the functions do not cover every driving scenario and are limited to the operational design of the vehicle.
Level 5: Full automation: operator-free driving.
Sensor Technologies Self-driving increases the number of sensors in vehicles. When designing cars, it's in the automaker's best interest to push hard for cost optimization, without sacrificing safety. Due to this strategy, the camera is currently the most prominently used sensor in today's cars, covering functions like emergency braking.

At the same time, the goal of reaching level 4 truly autonomous vehicles by 2020 (Levels of Driving Automation, SAE international standard J3016) emphasize the power of mixing Light Detection and Ranging (LIDAR) and Radar technologies. Each type of sensor brings the automobile closer to full autonomy.

Cameras are the Master of Classification and texture interpretation. By far the cheapest and most available sensor (but not the cheapest processing), cameras use massive amounts of data (full HD means millions of pixel or Megabytes in every frame), making processing a computationally intense and requires using complex image processing algorithms. Unlike both Lidar and Radar, cameras can see color, making them the best for scene interpretation.

Cameras are the cheapest sensor of the three and will likely remain the volume leader the near term. Their future will be strongly dependent on the development of the software algorithms controlling the self-driving car and how it can process the massive amount of data generated. LIDAR (considered to be the master of 3D mapping) is a technology that measures distance using laser light reflections. The technology can scan more than 100 meters in all directions, generating a precise 3D map of the car's surroundings. This information is then used by the car to make intelligent decisions about what to do next. The problem with Lidar systems is that they generate a large amount of data and are still quite expensive for Original Equipment Manufacturers (OEMs) to cheaply implement.

Due to their higher cost, LIDAR systems might remain a premium option for the time being as OEMs figure out the cost structure of their self-driving cars. Moving toward level 4 fully autonomous cars (SAE, 2014) will require essential safety-proven technology but the journey through levels 2-3 will find LIDAR systems lagging in take rate.

Radar is the master of motion measurement. Radar is a sensor system that uses radio waves reflections to determine the velocity, range and angle of objects. Radar is computationally lighter than a camera and uses far less data than a LIDAR system. While being less angularly accurate than lidar, radar can work in every condition and even use reflection to see behind obstacles. Modern self-driving prototypes rely on Radar and LIDAR to "cross validate" what they're seeing and to predict motion.

Radar is a proven technology increasingly becoming more efficient for the autonomous car. The new RF CMOS technology recently introduced to the market will allow smaller, lower power, efficient sensors that fit right into the OEM cost reduction strategy. This will also make radar more complementary to cameras as the "dynamic duo".

However, a single sensing technology will not be able to provide complete information coverage.

Table I presents a comparison of the three sensing technologies according to their performance.

TABLE I

|  | Camera | Radar | LiDAR | Autonomous Requirement |
|---|---|---|---|---|
| Object Detection | M | H | H | H |
| Classification | H | M | L | H |
| Close-Proximity Detection | M | H | L | H |
| Speed Detection | L | H | M | H |
| Lane Detection | H | L | L | H |
| Traffic Sign Recognition | H | L | L | H |
| Range | H (200 m) | H (250 m) | M (120 m) | Full range |
| Work in Rain, Fog, Snow | L | H | M | H |
| Work in Low Light | L | H | H | H |

TABLE I-continued

|  | Camera | Radar | LiDAR | Autonomous Requirement |
|---|---|---|---|---|
| Work in Bright Light | M | H | H | H |
| Size | Small | Small | Medium | Mix |
| Cost | $ | $$ | $$$$ | Mix |

FIG. 1 (prior art) illustrates the types of sensors that are currently used to assist the driver obtaining information regarding the driving environment. These sensors include long-range radar systems, short/medium range radar systems, LIDAR systems and cameras.

FIG. 2 (prior art) illustrates the concept of Connected Vehicles (CVs). Connected vehicle technologies allow vehicles to communicate with each other and the world around them. The connected vehicle concept is related to supplying useful information (including potentially dangerous situations to avoid) to a driver or a vehicle to help the driver make safer or more informed decisions. This technology allows transportation agencies to access vehicle data related to speed, location and trajectory—thereby enabling better management of traffic flow as the ability to address specific problems in real-time. So, in addition to sending information to the driver, CVs will send information to transportation agencies to enhance their knowledge of real-time road conditions, as well as generate historic data that will help agencies better plan and allocate future resources. It is therefore an object of the present invention to provide a road infrastructure and system for safely managing vehicles traffic, which is suitable for safe Autonomous Driving.

Other objects and advantages of the invention will become apparent as the description proceeds.

SUMMARY OF THE INVENTION

A system for providing smart road infrastructure for the purpose of vehicle safety and autonomous driving, comprising:
- a) a plurality of road units, which are located along the borders of each traffic lane and equally spaced from each other, where each road unit includes:
  - a.1) a read/write passive RFID tag operating at a predetermined frequency;
  - a.2) antenna for communicating with a plurality of transceivers, each of which is installed on each vehicle that travels along a traffic lane of the road, in response to signals transmitted from the transceivers;
  - a.3) a memory for temporarily storing data regarding each vehicle traveling along the lane and along adjacent lanes;
- b) at least one car unit that is installed in any vehicle travelling along a lane, where each car unit comprises:
  - b.1) an electromagnetic reader for interrogating the tags at a pre-determined rate, the reader receives, from the tags, data regarding the movement parameters of a vehicle that previously passed the tags along the current lane, or vehicles in adjacent lanes that previously passed the tags, and writes data regarding the movement parameters of a vehicle that currently passing the tags, into corresponding sections of the memory of the tags, the reader includes a first transceiver that is installed on the left front of the vehicle and a second transceiver that is installed on the right front of the vehicle; and
  - b.2) a processor being in bidirectional data communication with the transceivers and with the vehicle inherent control systems, for processing data received from the tags and calculating speed and location of the vehicle with respect to the borders of the lane and to other neighboring vehicles traveling along the lane and along adjacent lanes, to provide alerts to the driver, or to intervene in the operations of the control systems of the vehicle, or to take over control of the vehicle.

The system may be further adapted to communicate with additional vehicle safety systems, to alert the driver visually and/or audibly, regarding potential safety problems and/or taking over control of the vehicle using the vehicle's inherent control systems, for avoiding collisions and implementing a required Advanced Driver Assistance Systems (ADAS) level.

The safety operations may include one or more of the following:
- Lane Departure Warning (LDW);
- Forward Collision Warning (FCW);
- Automatic Emergency Braking (AEB);
- Adaptive Cruise Control (ACC);
- Lane Keeping Assist (LKA);
- Lane Centering (LC);
- Traffic Jam Assist (TJA);
- Side Collision Warning (SCW).

The read/write passive RF tag may be implemented as a micro-chip with a protective cap.

The antenna may be a quarter wavelength that corresponds to the operating frequency. The antenna may be a sharpened metal rod that is nailed into the infrastructure of the lane borders, using pneumatic force applied by a pneumatic nail gun, while moving.

The processor may be further adapted to provide accurate location information ubiquitously and instantaneously without acquisition time, with lane-level resolution in addition to other essential data to vehicles, equipped with autonomous and "Connected Vehicles" system and to provide accurate acceleration or deceleration information to an ADAS system.

The transceivers may communicate with the RF tags via directional antennas implemented as phased array.

The distance between adjacent tags may be different in highways and urban roads.

The instantaneous speed may be calculated by determining the time elapsed between receiving signal power peaks from two consecutive tags and from the known distance between the adjacent tags.

The time elapsed between receiving signals from two adjacent tags may be the time between receiving two subsequent power peaks of predetermined digital words.

The calculated speed and the acceleration or deceleration along with the real timing and the vehicle length may be written into the tag by the transceiver of the car that passes the tag.

In one aspect, each time the vehicle behind passes a tag, the distance from the vehicle ahead being the distance from the front of the car to rear of the vehicle ahead, the current speed and changes in the vehicle's speed, are calculated, for providing Forward Collision Warning (FCW).

Departure from the center of the lane of a vehicle may be calculated as a function of the difference between average power strength of the right and left boundaries along n samples, for providing Lane Keeping Assist (LKA) and Lane Centering (LC).

Whenever the left electromagnetic reader passes a predetermined number of left-sided tags with insufficient reception levels, or stops receiving signals from the left-sided tags and starts receiving the left-sided tags of the left adjacent lane, or whenever the right electromagnetic reader passes a predetermined number of right-sided tags with insufficient reception levels, or stops receiving signals from the right-sided tags and starts receiving the right-sided tags of the right adjacent lane, the car processor determines that the vehicle departs from the current lane, and a Lane Departure Warning (LDW) signal is sent to the driver and to the ADAS system of the vehicle.

The plurality of road units, which are deployed along the borders of a dedicated route, along which vehicles equipped with the required means, are intended to drive autonomously, where the vehicles enter the autonomous mode at the "start point" and autonomously drive along the route until reaching the "end point", where it returns back to non-autonomous mode.

Whenever an RFID tag is interrogated by a reader of a vehicle passing the RFID tag, the tag stores a timestamp representing the time the vehicle passed the RFID tag, in a predetermined section in its memory, for allowing a dedicated vehicle having a reader to collect all timestamps from the section, for future analysis.

Future analysis may include:
identifying traffic congestions in road segments along with their timing;
counting the total number of vehicles travelling along road segments over any desired time period;
help agencies to better plan and allocate future resources;
data for performing maintenance operations.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
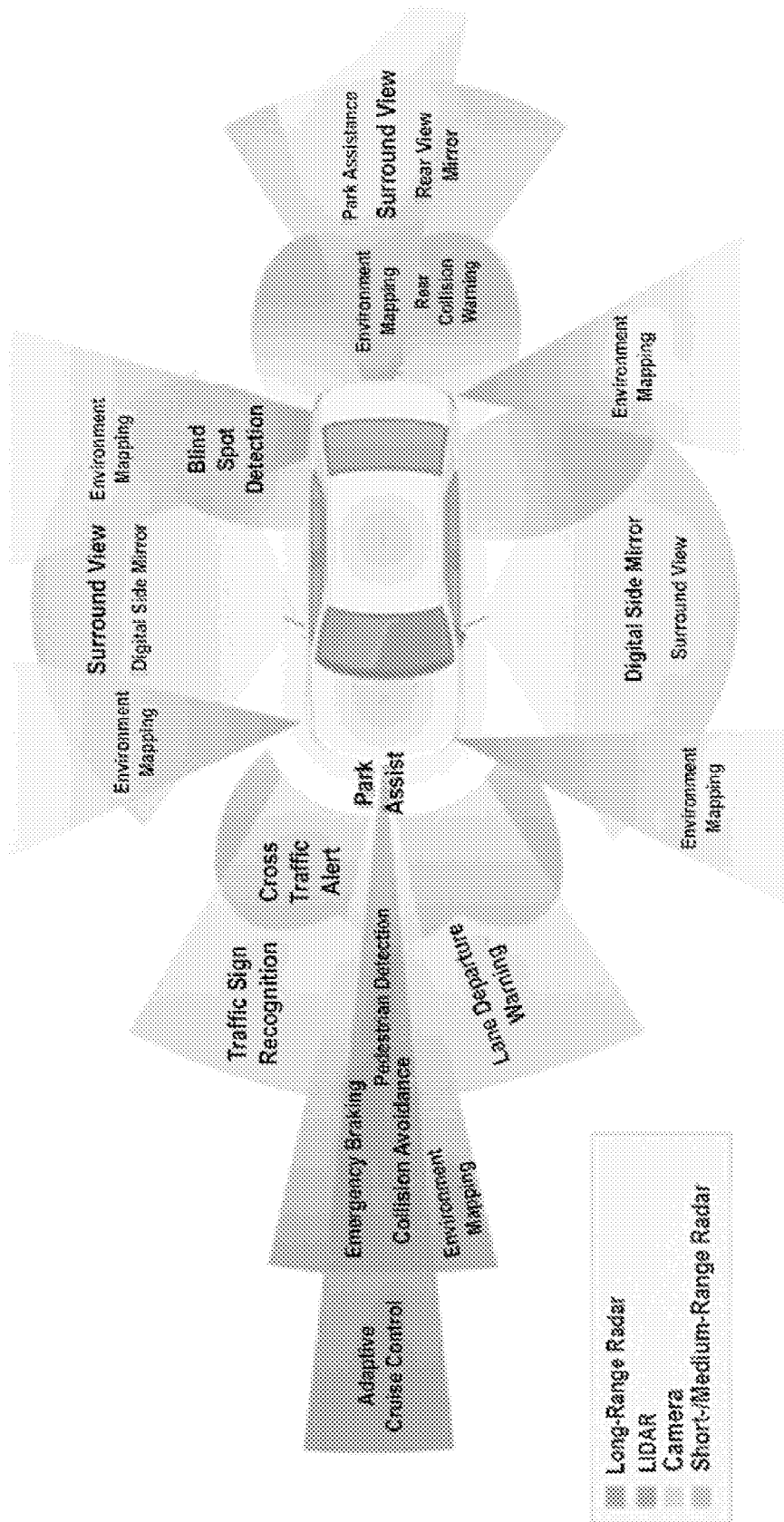
FIG. 1 (prior art) illustrates the types of sensors that are currently used to assist the driver obtaining information regarding the driving environment.
Figure 2:
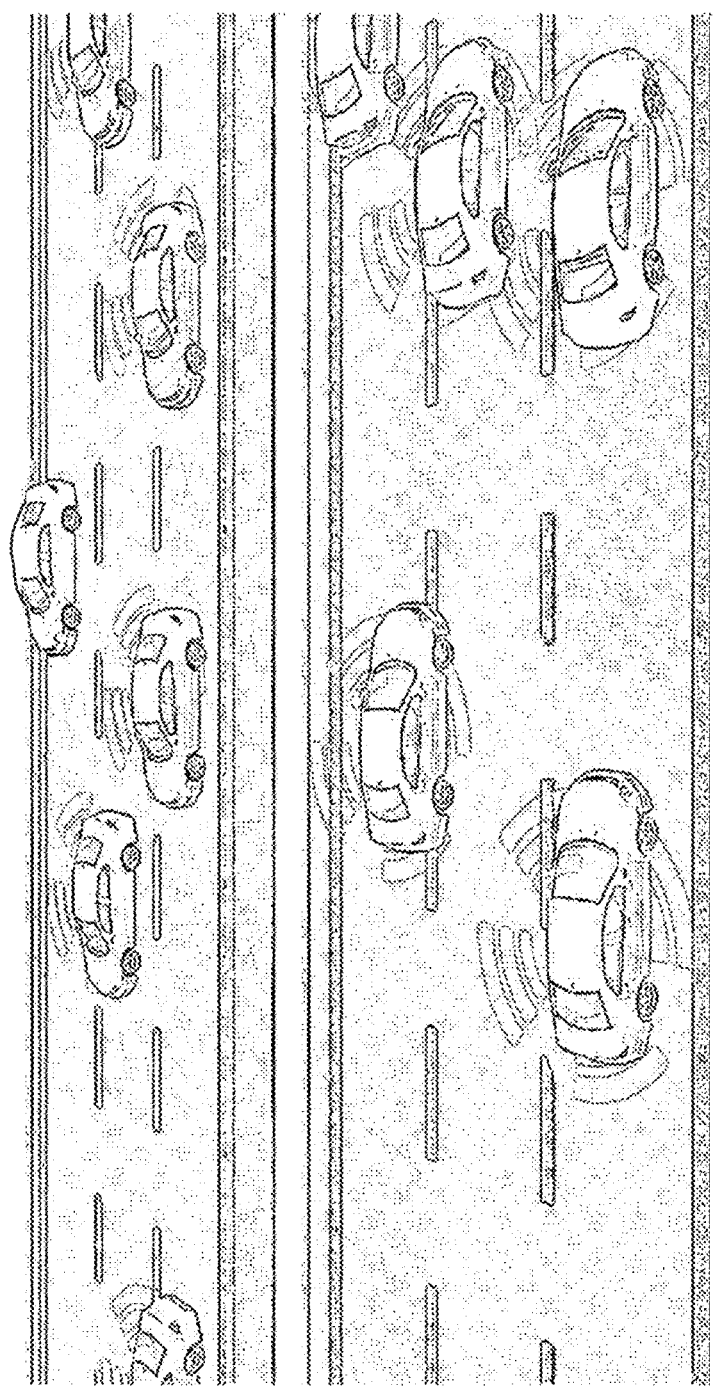
FIG. 2 (prior art) illustrates the concept of Connected Vehicles (CVs)
Figure 3:
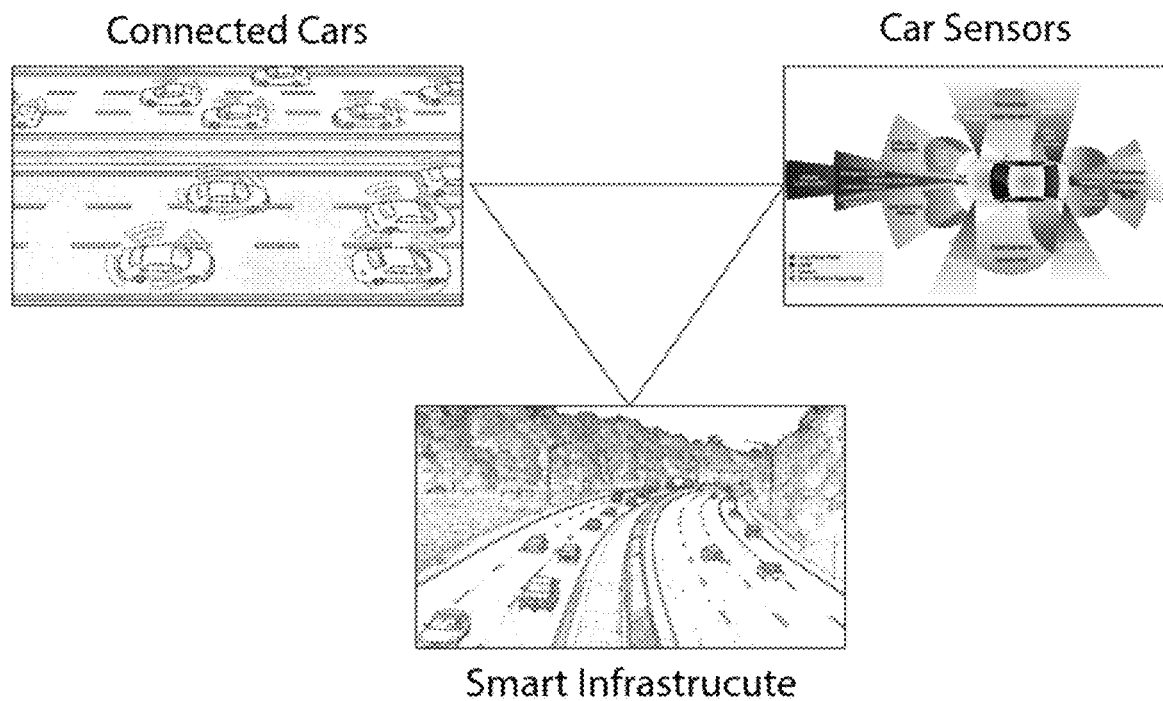
FIG. 3 illustrates the general concept of the proposed system.

The present invention proposes a method and system for managing vehicles, which forms an infrastructure for Vehicle Safety and Autonomous Driving, based on a novel smart road infrastructure. The general concept of the proposed system is shown in FIG. 3. The proposed system consists of a unique combination of a smart road infrastructure of RFID passive read/write tags which communicate with a Reader/Writer apparatus installed on each vehicle traveling along a lane, that will be described later on.

The proposed system may be complementary to the existing car sensors and/or to the capabilities of connected/autonomous vehicles described above, so as to obtain a complete system that takes advantage of these three elements to achieve the most reliable and cost-effective performance.

Figure 4:
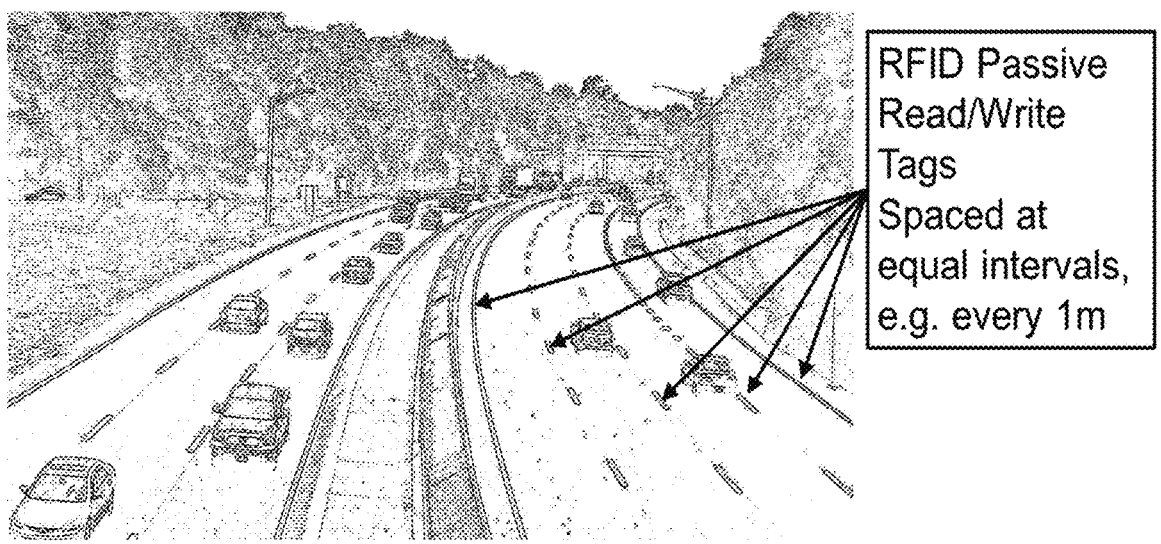
FIG. 4 illustrates the smart infrastructure proposed by the present invention.

The smart infrastructure proposed by the present invention is shown in FIG. 4. The smart infrastructure includes a plurality of Read/Write Passive tags that are installed (inserted into the road substrate) along the road lanes, on the right- and left-hand sides of each lane, with equal spaces (e.g., 1 m) between any adjacent tags. These Read/Write Passive tags communicate with an electromagnetic reader that is installed in every vehicle.

Microchips in RFID tags can be read-write, read-only or "write once, read many" (WORM). Read-write tags can add information to the tag or overwrite existing information when the tag is within the reception range of a reader. Read-write tags usually have a serial number that cannot be overwritten. Additional blocks of data can be used to store additional information about the items the tag is attached to (these can usually be locked to prevent overwriting of data). Read-only microchip tags have information stored on them during the manufacturing process. The information on such tags can never be changed. WORM tags can have a serial number written to them once, and that information cannot be overwritten later.

Most passive RFID tags simply reflect back electromagnetic waves they receive from the reader. Such passive tag use energy harvesting, a technique according to which energy from the reader is gathered by the tag, stored temporarily and transmitted back to the reader after a predetermined time.

RFID, is a generic term for technologies that use radio waves to automatically identify people or objects. There are several methods of identification, but the most common method is to store a serial number that identifies a person or an object associated with this serial number, and perhaps other information, on a microchip that is attached to an antenna (the chip and the antenna together are called an RFID transponder or an RFID tag).

The smart infrastructure consists of Passive Read/Write RFID tags that are installed along the road lanes, on the right- and left-hand sides of the lanes (including the road left and right yellow lines, which mark the beginning of the road shoulders), and Electromagnetic reader that is installed in every vehicle.

The tags may be deployed automatically with pneumatic device while driving along the road. In this embodiment, the tags are of the passive read/write RFID tags.

Figure 5:
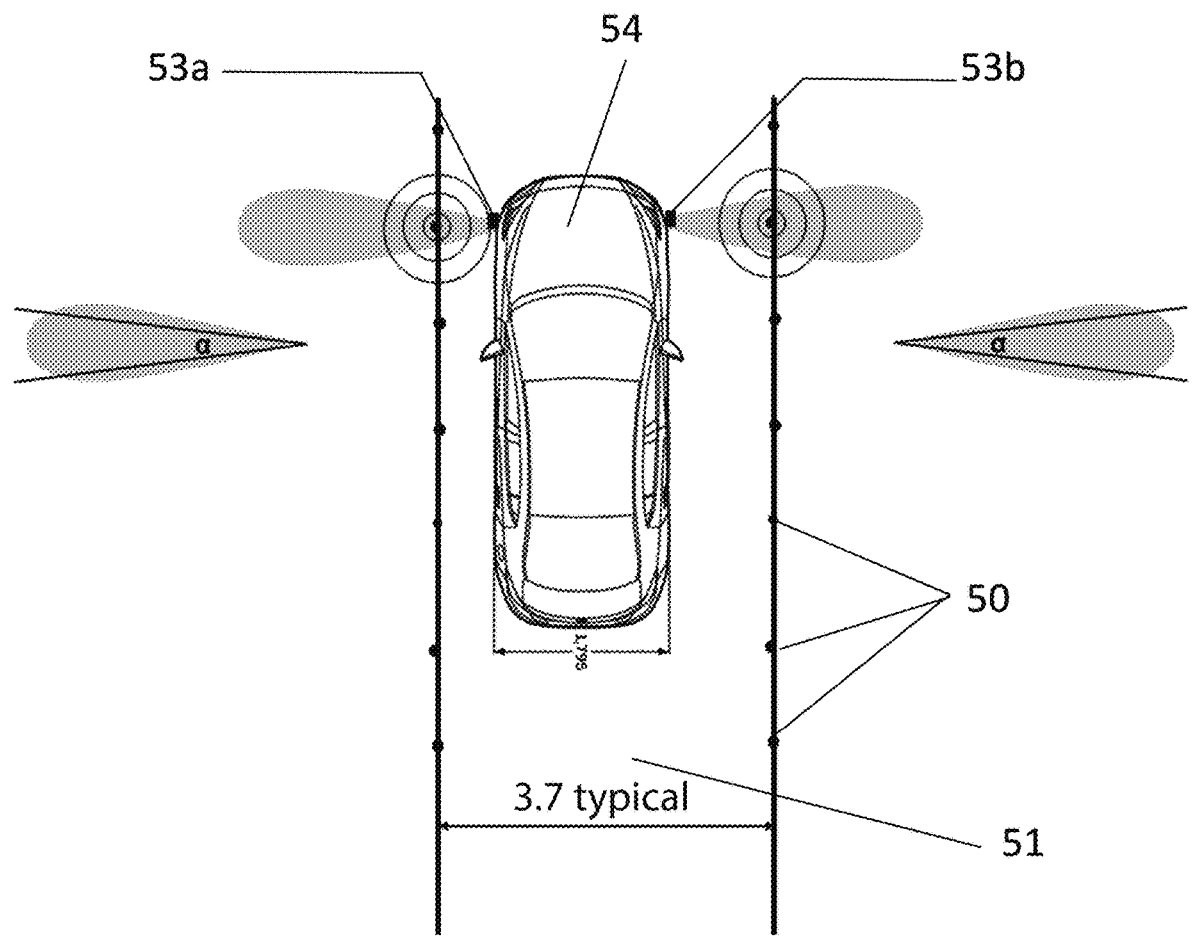
FIG. 5 is a top view of the deployment of the Read/Write Passive RFID tags along a lane, according to an embodiment of the invention.

FIG. 5 is a top view of the deployment of the Read/Write Passive tags 50 along a lane 51, according to an embodiment of the invention. The electromagnetic reader 53 at each side of the vehicle 54 interrogates the tags at a pre-determined rate, which may change with the vehicle speed and other possible parameters and receives information from the tags and writes data into the tags.

Based on this information, a processor on the vehicle (not shown) that is communicating with the reader executes algorithms that support accurate implementation of (all or part) of the following tasks: Lane Departure Warning—LDW, Forward Collision Warning—FCW, Automatic Emergency Braking—AEB, Adaptive Cruise Control—ACC, Lane Keeping Assist—LKA, Lane Centering—LC, Traffic Jam Assist—TJA and—side Collision Warning—SCW.

The system can alert the driver visually and/or audibly regarding potential safety problems and/or taking over control of the vehicle.

The system proposes an infrastructure that supports implementation of ADAS (Advanced Driver Assistance Systems) from ADAS1 to ADAS5, which may be adapted to comply with the vehicle sensors (Camera, Radar or Lidar) and Connected Vehicles.

For the "connected vehicles initiative" the system provides accurate location information with lane-level resolution in addition to other essential data (overcoming the GSNN limitations of Accuracy, iniquitousness and Acquisition time), even in underground tunnels and "Urban Canyons" (where GPS does not exist or encounter reception problems).

The advantages are higher accuracy, low cost and weather independence (see the Sensing Technology comparison table).

According to one embodiment, the system may be realized using standard Radio Frequency Identification (RFID) chips (readers and tags, e.g. UHF RFID) or dedicated readers and tags (the transportation huge market size may enable using special purpose dedicated RFID tags and dedicated equipment that will be an inherent part of the vehicles).

The antenna allows the RFID chip to transmit the identification information to an electromagnetic reader 53. The reader 53 converts the radio waves reflected from the RFID tag (in response to an interrogation signal) into digital information that can then be passed on to computers that can use it. RFID tags may be active or passive. Active RFID tags have a transmitter and their own power source (typically a battery). The power source is used to activate the microchip's circuitry and to broadcast a signal to a reader 53. Passive tags have no battery. Instead, they draw power from the reader 53, which transmits electromagnetic waves that induce current in the tag's antenna.

Figure 6:
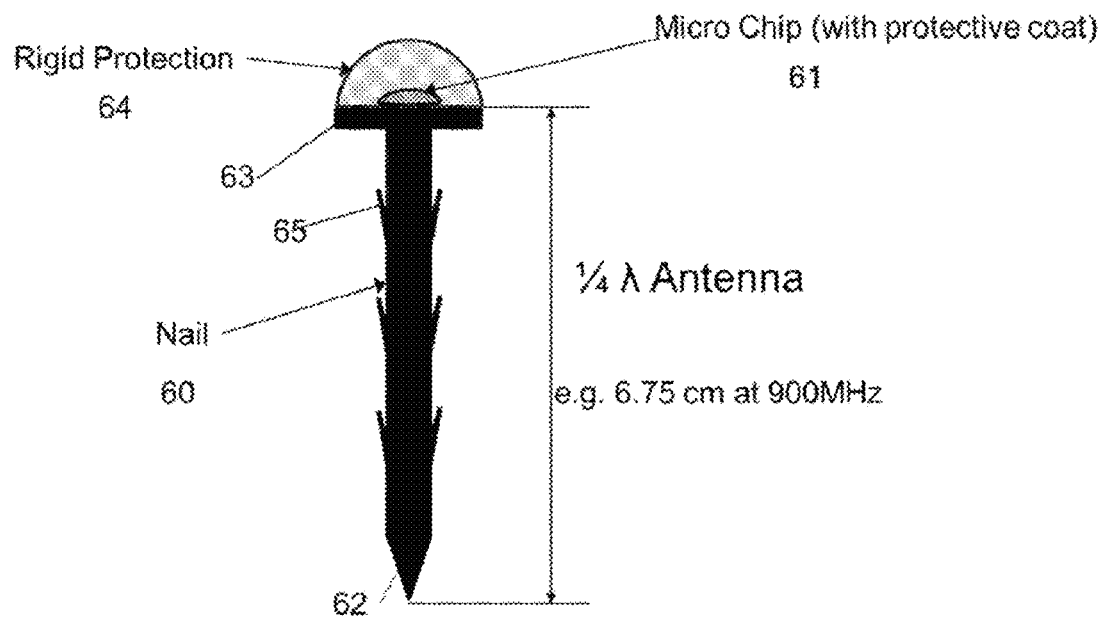
FIG. 6 illustrates the structure of the Read/Write Passive RFID tag, according to an embodiment of the invention.

FIG. 6 illustrates the structure of the Read/Write Passive RFID tag, according to an embodiment of the invention. In order to install the tag into the road upper layer, a metal carrier 60 that carries the RFID tag chip 61 is used. The carrier 60 has a sharpened tip 62 and may be in the form of a nail, the head of which is a horizontal flange 64. The carrier 60 may have sharpened unidirectional tips 65 for allowing easy insertion to, and preventing extraction from, the asphalt layer. The RFID chip 61 is attached to the top surface of the flange 63 and is covered with a half-dome 64, made from non-conductive rigid protection material. The RFID chip 61 is electrically connected to the metal carrier 60, in order to function as transmit/receive antenna. The nail sharpened body may be a tubular rod of a quarter wavelength $\lambda/4$ at the tag's operating frequency and actually functions as the RFID tag's antenna. For example, if the operating frequency is 900 MHz, the quarter wavelength $\lambda/4$ will be 6.75 cm.

Figure 7:
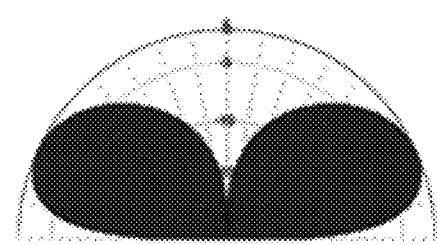
FIG. 7 shows the desired antenna radiation pattern in the vertical x-y plane.

FIG. 7 shows the desired antenna radiation pattern in the vertical x-y plane.

Figure 8:
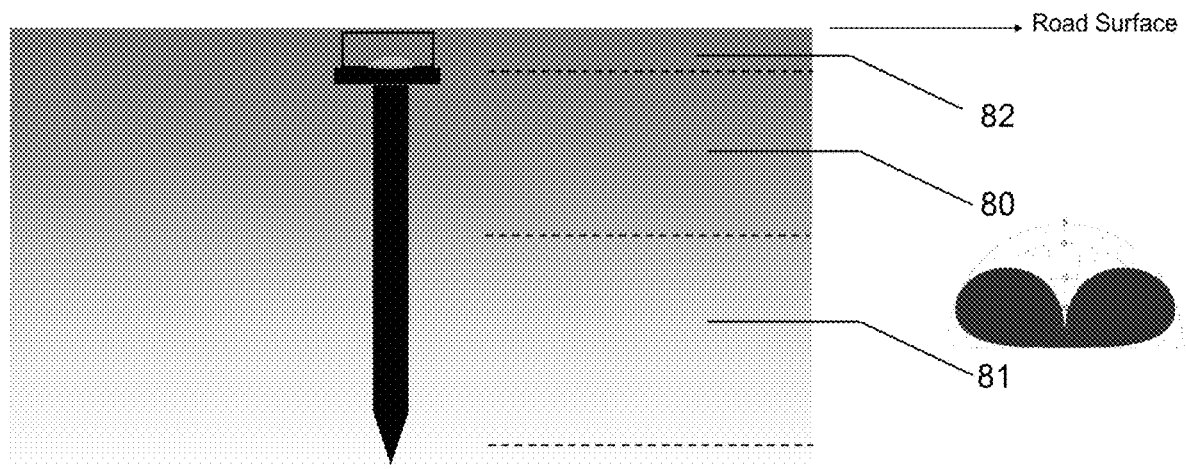
FIG. 8 is a cross-sectional view of possible installation of The RFID tags installation along the road.

FIG. 8 is a cross-sectional view of possible installation of The RFID tags fixation along the road. It can be seen that the carrier 60 (a nail in this example) is inserted into the road upper surface (which usually consists of an asphalt intermediate layer 80, sandwiched between an asphalt base layer 81 and an asphalt wearing surface 82.

Figure 9:
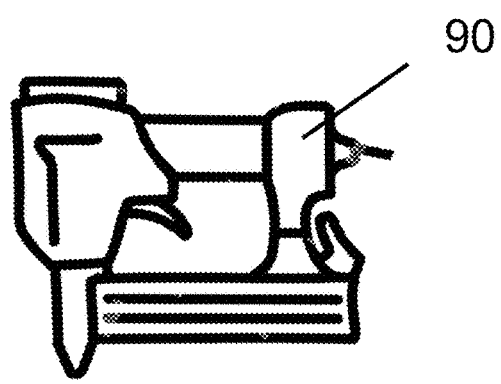
FIG. 9 illustrates automatic installation along the road by pneumatic force applied for example, by a pneumatic apparatus which operates in a way similar to the operation of a pneumatic nail gun.

The RFID tags may be installed automatically along the road by pneumatic force applied for example, by a pneumatic apparatus which operates in a way similar to the operation of a pneumatic nail gun 90, shown in FIG. 9. Pneumatic nail gun 90 may be installed to a vehicle which continuously measures the displacement while driving, such that the operator will be able to shoot each RFID tag carrying nail 60 at every desired location, so as to obtain an accurate equal spacing between adjacent RFID tags. Such an automatic deployment of the RFID tags may be carried out in road segments, lane by lane until deployment is completed for all lanes in each segment, in order to install the smart infrastructure fast and efficiently.

Figure 10:
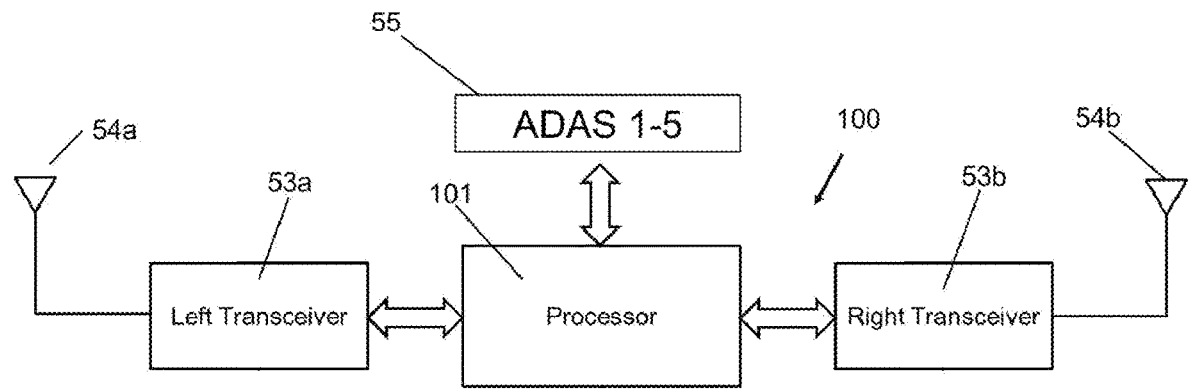
FIG. 10 is a block diagram of the Reader/Writer apparatus installed on each vehicle.

FIG. 10 is a block diagram of the Reader/Writer apparatus installed on each vehicle. Apparatus 100 comprises two transceivers, a left transceiver 53*a* and a right transceiver 53*b* with antennas 54*a* and 54*b*, respectively. A processor 101 controls the transceivers' operation mode (transmit and/or receive modes) and processes the data received from each RFID tag being in range. Processor 101 processes the data received from RFID tags and communicates with the vehicle's ADAS system 55, in order to provide information regarding the movement parameters of the vehicle (such as location, speed, direction, etc.), for allowing the ADAS system 55 to assist the driver according to the level of the ADAS system. The movement parameters are derived from communication of left and right transceivers 53*a* and 53*b* with the RFID tags being in range along each border of the lane in which the vehicle travels.

Figure 11:
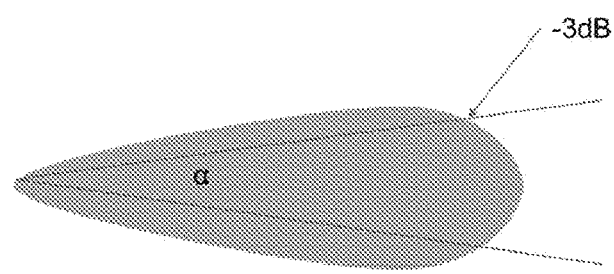
FIG. 11 shows a typical desired radiation pattern of each reader's antenna.

FIG. 11 shows a typical desired radiation pattern of each reader's antenna. The readers 53a and 53b can be equipped with phased array antennas, in order to achieve the desired radiation pattern (such as gain, beam width, etc.) and to increase the read/write range of passive RFID tags. In this example, the angle α of the main lobe of each antenna is limited to α<30° to keep the antenna being more directional.

The vehicle self-speed can accurately be measured using the smart infrastructure that consist of the deployed array of RFID tags 50. The measured speed is the instantaneous speed calculated according to the time it takes the vehicle to pass between two adjacent RFID tags. This time is for example 0.0036 Sec for a vehicle moving at 100 Km/h for spacing of d=1 m between two consecutive RFID tags. In addition, the acceleration or deceleration can be easily determined by calculating speed changes as a function of time.

Figure 12:
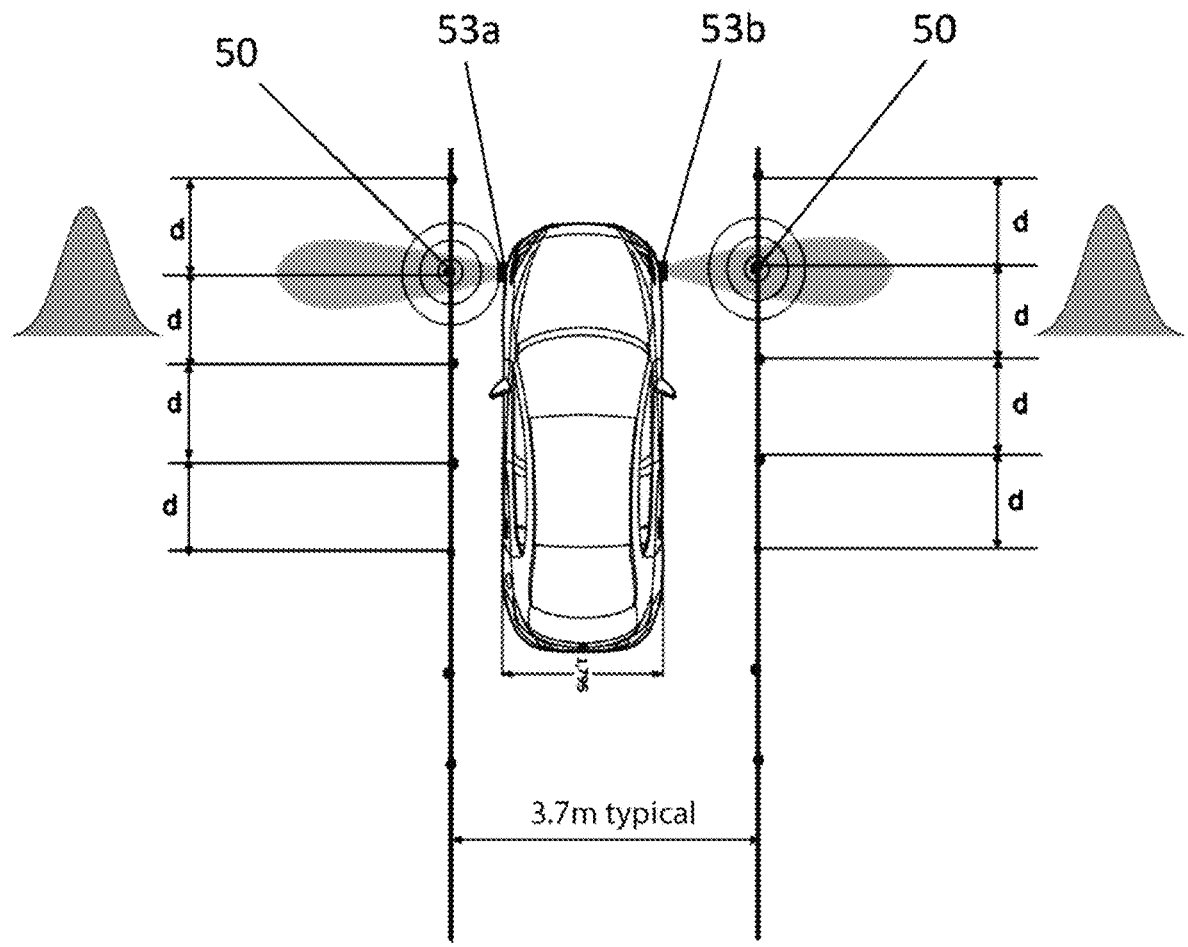
FIG. 12 illustrates the installation of Passive Read/Write RFID tags along the road lanes, on the right and left-hand sides of the lanes, spaced at equal distance.

The system Passive Read/Write RFID tags are installed along the road lanes, on the right and left-hand sides of the lanes, spaced at equal distance d, as shown in FIG. 12. When the distance between the reader 53b and the closest RFID tag 50 is minimal, the received power has a peak, the timing of which can be detected. The distance between adjacent tags can be different in highways and urban roads.

The tags are Passive (Read/Write). They are based on Energy Harvesting. Every time the car reader passes through a tag, energy from the reader is gathered by the tag, stored briefly and then the tag transmits back to the reader a predetermined digital word. Each tag is identified by the predetermined digital word. Basically, when the vehicle's travels, the readers 53a and 53b the reception range of the next RFID tag, the tag can response to the reader's interrogation signals. However, if the signal strength is not sufficient, there can be disruption in the received word. When the reader is exactly in line with the closest RFID tag 50, the predetermined digital word is clearly received by the reader without errors or disruption. Therefore, upon receiving the expected digital word, the processor 101 decides that the location of the reader 53 is in line with the closest RFID tag 50. This way, the predetermined digital word can replace the reception of a power peak described above.

By determining the time elapsed between two adjacent tags and from the known distance d between them, the vehicle's speed is calculated. The measured time is based on the reader's internal clock, which is very accurate.

Figure 13:
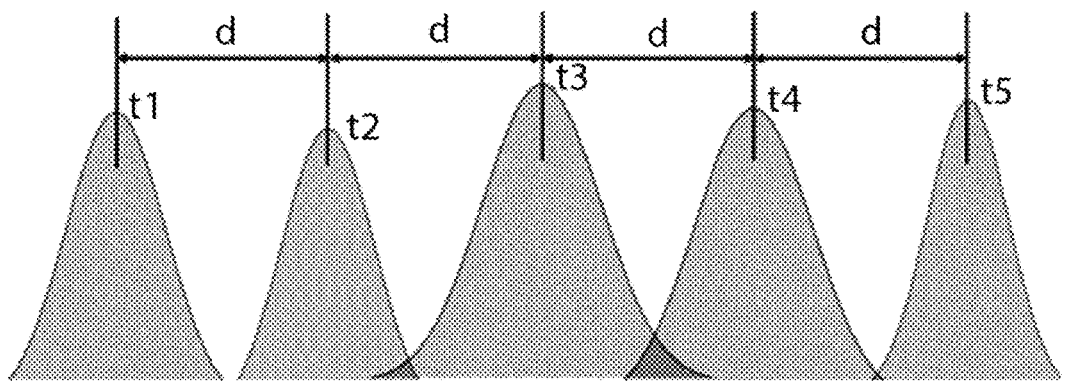
FIG. 13 shows the time it takes the vehicle to pass the distance between two adjacent RFID tags is the time between two consecutive received power peaks having equal or different levels.

The time ($t_{i+1}-t_i$) it takes the vehicle to pass the distance between two adjacent RFID tags is the time between two received power peaks, as shown in FIG. 13. Therefore, the vehicle's instantaneous speed is calculated by $$v_i = \frac{d}{t_{i+1} - t_i}$$

Figure 14:
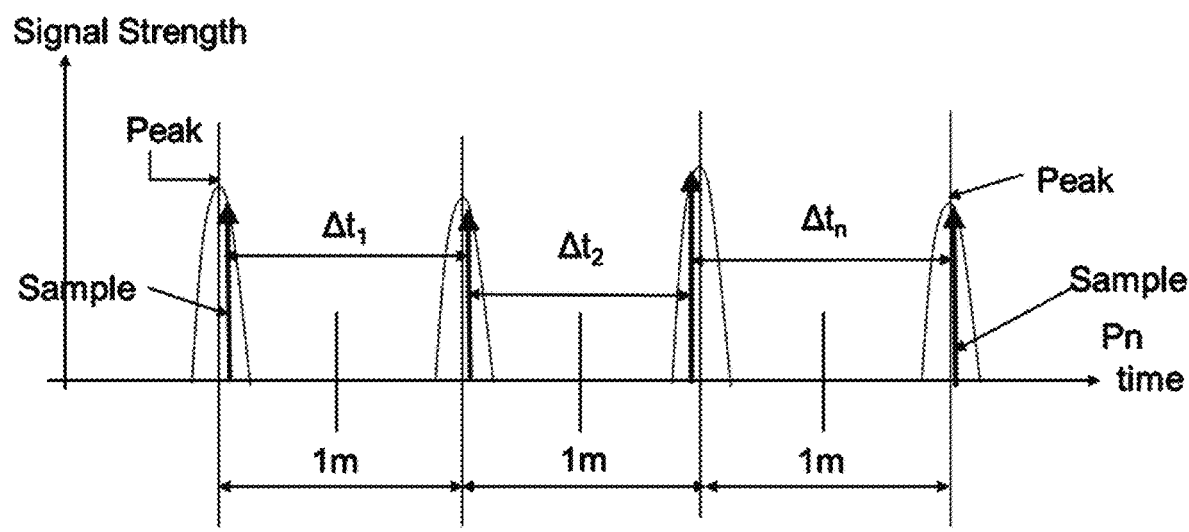
FIG. 14 shows the time it takes the vehicle to pass the distance between two adjacent RFID tags is the time elapsed between two consecutive received samples of the transmitted digital word.

If the transmitted signal is a known stored digital word, the time it takes the vehicle to pass the distance between two adjacent RFID tags is the time elapsed between two consecutive received samples of the transmitted digital word, as shown in FIG. 14. As can be seen, the samples not always fall exactly on the power peak but the deviation is neglectable.

In this case, the vehicle's instantaneous speed is calculated by using these samples and is given by:

$$v_{ni} = \frac{d}{\Delta t_n} = \frac{1 \text{ m}}{\Delta t_n}$$

Figure 15:
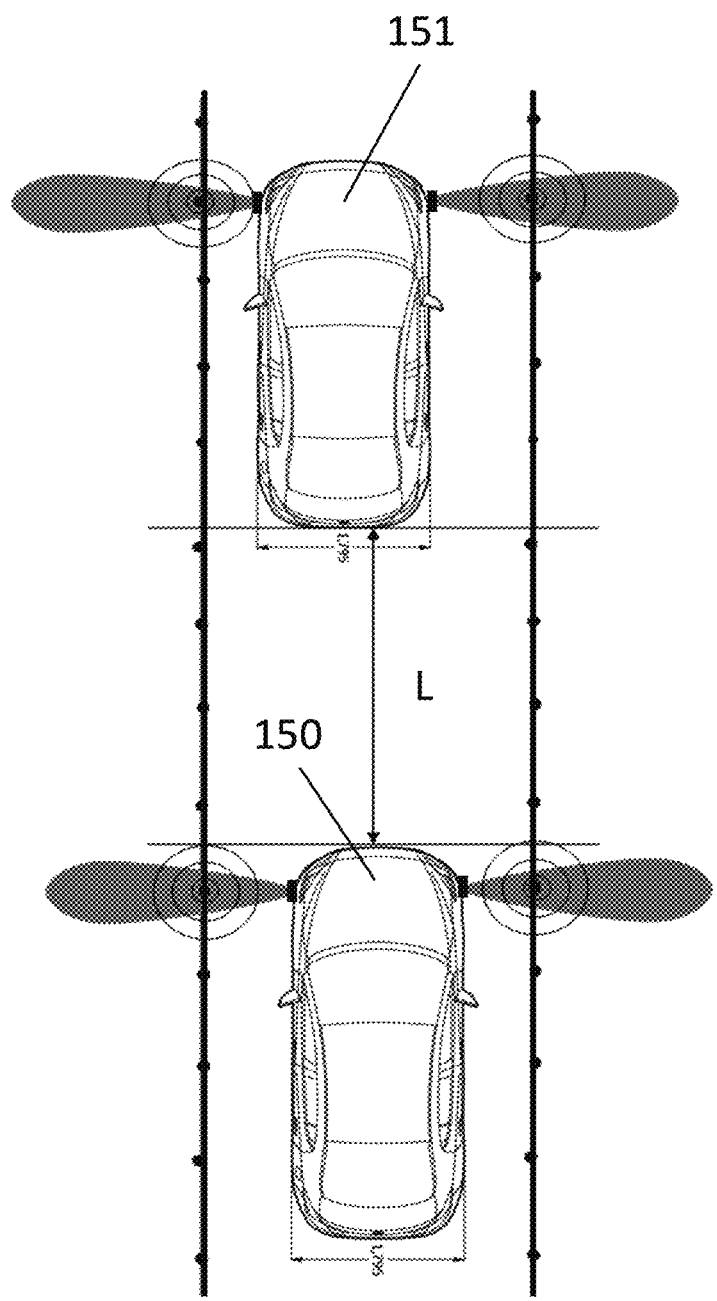
FIG. 15 shows the calculations made by the processor in order to provide Forward Collision Warning (FCW)

FIG. 15 shows the calculations made by the processor 101 in order to provide Forward Collision Warning (FCW). As described above, each time the vehicle passes an RFID tag the vehicle's instantaneous self-speed is calculated. Since the tags are Read/Write tags, the calculated vehicle speed, the acceleration or deceleration, along with the accurate real timing of passing and the vehicle length are written into the RFID tag. When a vehicle behind 150 passes an RFID tag, it reads the data that was written by the car 151 ahead, namely: the speed, the real timing at which the speed was measured, the acceleration or deceleration, and the vehicle length (which is known and stored for each vehicle).

Since current real timing is known, the elapsed time can be calculated and from the remaining data the distance between the cars can be easily calculated.

Each time the vehicle behind 150 passes an RFID tag, the distance L from the vehicle ahead (from the front of the vehicle behind to rear of the vehicle ahead) is calculated. Since the distance is known, the change in distance is also known. This constantly available data can be used to provide Forward Collision Warning (FCW), when the distance L is too short with respect to the traveling speed.

Figure 16:
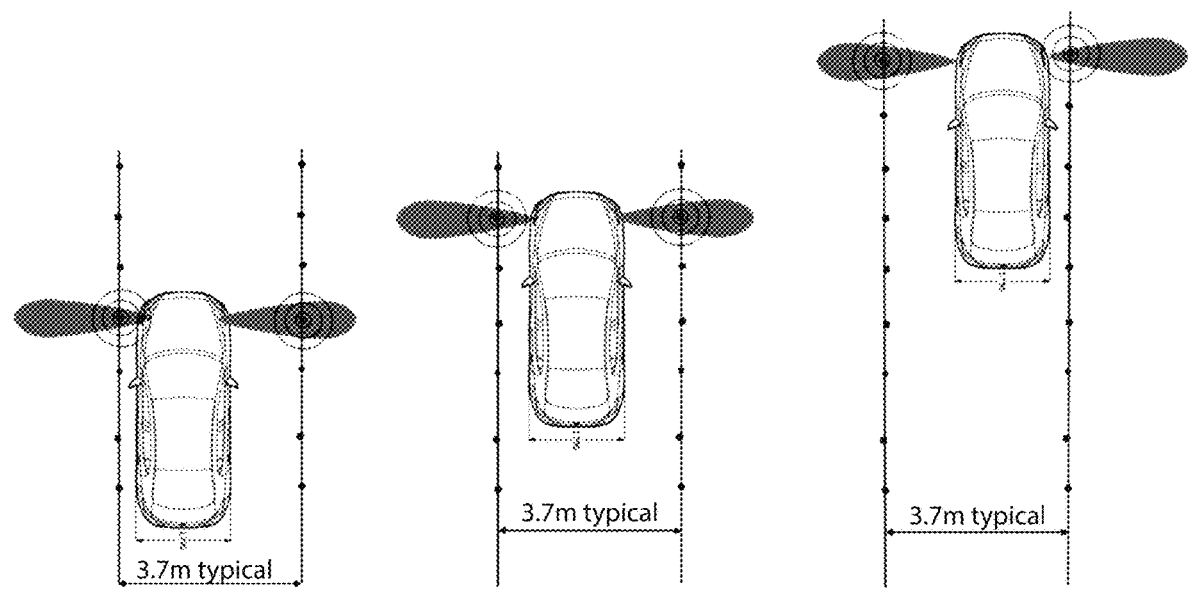
FIG. 16 illustrates the problem of deflection of the vehicle from the center of the lane.

FIG. 16 illustrates the problem of deflection of the vehicle from the center of the lane. Lane Centering (LC) also known as auto steer, is a mechanism designed to keep the vehicle centered in the lane, relieving the driver from the task of steering.

Figure 17:
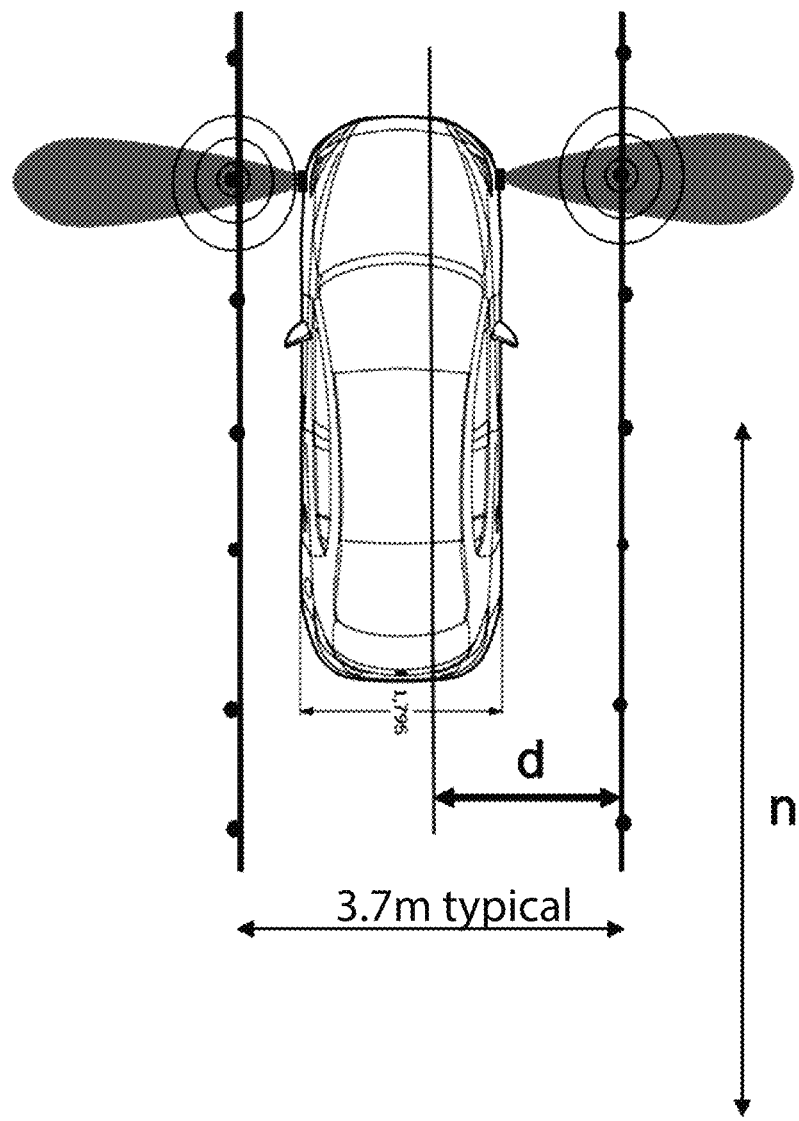
FIG. 17 illustrates the calculation of a deflection from the lane center.

The system proposed by the present invention can use the smart infrastructure for detecting such deflections and provide warning to the driver or activate an LC mechanism. FIG. 17 illustrates the calculation of a deflection d from the lane center. Car departure from the center of the lane is a function of D which is the deflection relative to the right (or left) lane boundary. D is relative to the difference between average power strength PRk of the right boundary and the average power strength PLm of the left boundary along n samples $$D = \frac{1}{n}\left[\sum\nolimits_1^n PRk\right] - \frac{1}{n}\left[\sum\nolimits_1^n PLm\right]$$

The power peaks that are received from left and right are not necessarily equal and therefore, the left and right power peaks are indicated PLm and PRk, respectively. In addition, the number of sample n should be sufficiently large since some tags may fail and a small number of samples may cause the average received power to fall. If n is large, failures of several tags will hardly affect the average receive power.

This way, deflections (as a function of D) from the lane center may be calculated, in order to provide warnings to the driver or activate an LC mechanism.

Figure 18A:
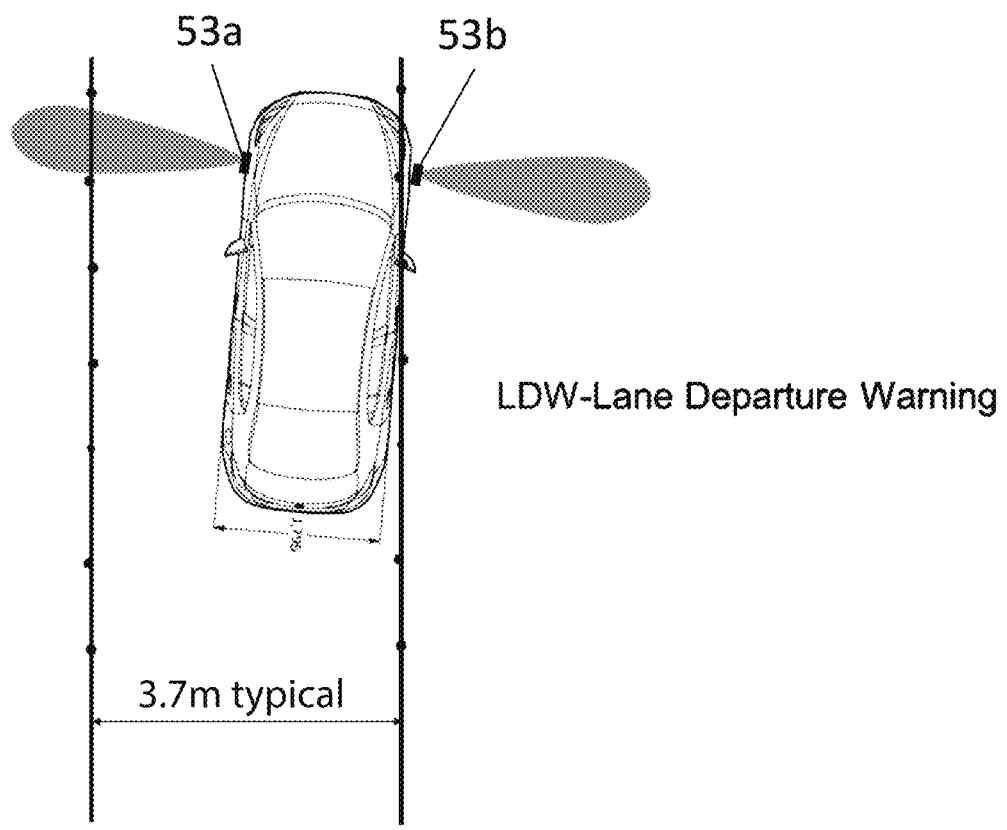
FIG. 18A illustrates departure start towards the right direction.

The proposed system is also adapted to make calculations by the processor 101 in order to provide Lane Departure Warning (LDW) to the driver or to the ADAS system in his vehicle. As long as the driver drives within the lane boundaries, both the left and right RFID tags along the lane borders should be received by the electromagnetic readers 53a and 53b with essentially equal reception levels (signal strengths). Thus, by comparing the left and right reception levels Lane Centering (LC) may be implemented as described above. However, when lane departure starts, for example towards the right direction, as illustrated in FIG. 18A, electromagnetic reader 53a stops receiving signals from the right-sided tags with sufficient reception level (since the vehicle now travels over them and the reader cannot communicate with them any more). Similarly, when lane departure starts, for example towards the left direction, electromagnetic reader 53a stops receiving signals from the left-sided tags with sufficient reception level (since the vehicle now travels over them and the reader cannot communicate with them any more).

After passing a predetermined number of left-sided tags with insufficient reception levels, and when starting to receive the right-sided tags of the right adjacent lane, it is clear that the vehicle departs from the current lane to the right and a warning signal is sent by the car processor 101 to the driver and to the ADAS system 55.

Figure 18B:
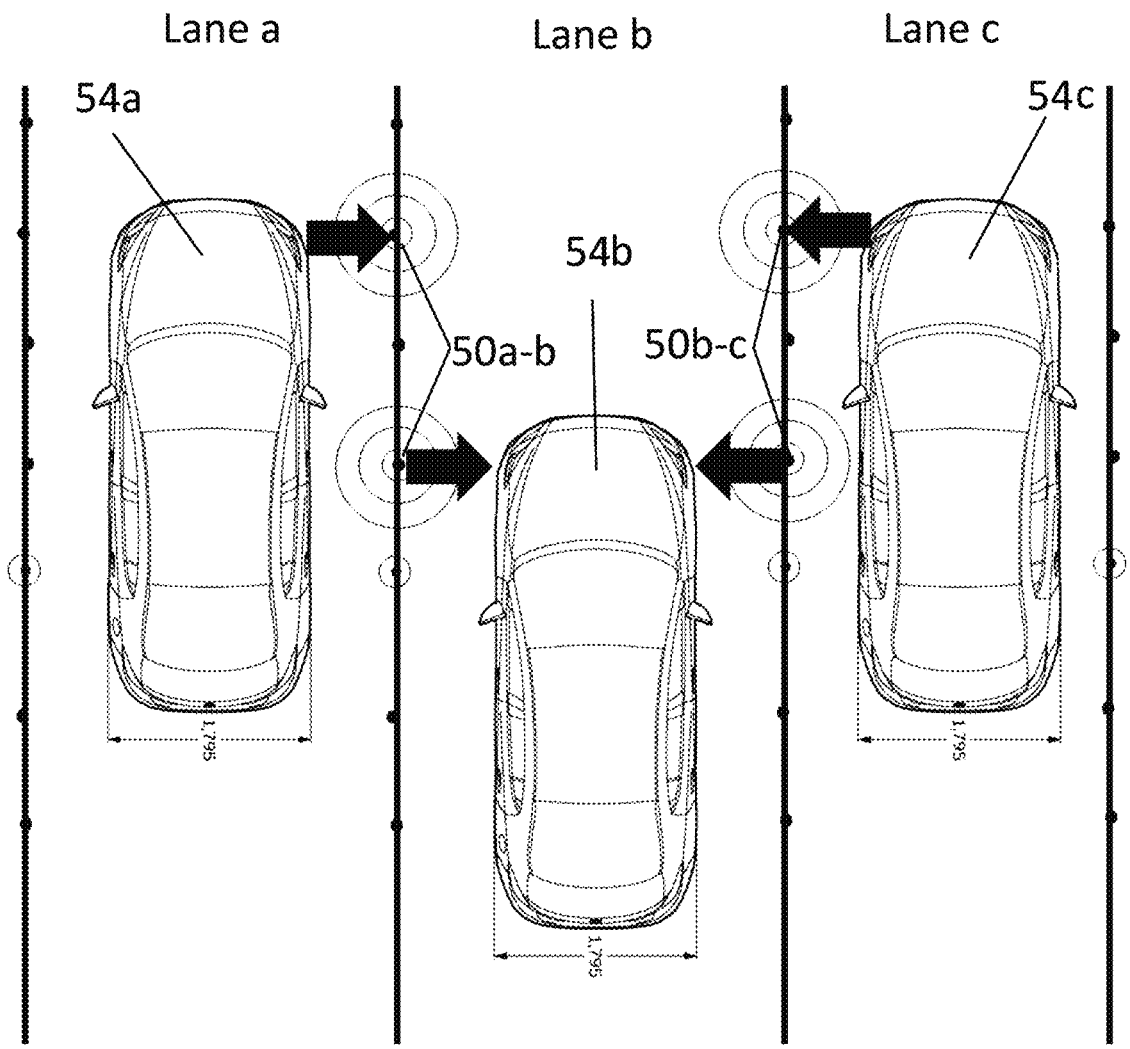
FIG. 18B illustrates an example of read/write operations to the deployed tags by three vehicles that travel along different lanes.

FIG. 18B illustrates an example of read/write operations to the deployed RFID tags by three vehicles that travel along different lanes, in order to provide Side Collision Warning (SCW) to the driver or to the ADAS system. In this example, a vehicle 54b is traveling along Lane b, while two vehicles 54a and 54c are traveling along Lanes a and c, respectively. Basically, when each vehicle in a lane passes a right and left tag, it reads the last data written by the car ahead and overwrites the data with its data. Each data that corresponds to a vehicle moving in a lane is marked for that lane and stored accordingly in a corresponding memory section of the tags. This lane related data can be overwritten only by vehicles behind which are moving along that lane and cannot be overwritten by vehicles moving along neighboring lanes. On the other hand, each vehicle moving along a lane can read data written into tags of each neighboring lane. This arrangement is used by the system of the present invention to provide SCW to the drivers or ADAS system.

In this example, vehicle 54b moves along lane b, while vehicle 54a moves along lane a and vehicle 54c moves along lane c. The row of tags 50a-b along the border between lanes a and b stores data written from the left by vehicle 54a in a first specific memory section of each tag 50a-b and the data written from the right by vehicle 54b in a second specific memory section of each tag 50a-b.

Similarly, the row of tags 50b-c along the border between lanes b and c stores data written from the left by vehicle 54b in a first specific memory section of each tag 50b-c and the data written from the right by vehicle 54c in a second specific memory section of each tag 50b-c.

Therefore, when vehicle 54b passes a tag 50a-b, it reads the data written before into the same tag by vehicle 54a (in addition to the data written by the vehicle ahead in lane b), since vehicle 54a is also ahead. Similarly, when vehicle 54b passes a tag 50b-c, it reads the data written before into the same tag by vehicle 54c (in addition to the data written by the vehicle ahead in lane b), since vehicle 54c is also ahead. Reading consecutive data from consecutive tags 50a-b allows the processor 101 in vehicle 54b to identify the fact that there is a vehicle in lane a and obtain its movement parameters (such as location, speed, direction, etc.). Reading consecutive data from consecutive tags 50b-c allows the processor 101 in vehicle 54b to identify the fact that there is a vehicle in lane c and obtain its movement parameters (such as location, speed, direction, etc.), as well.

This data is used by the ADAS of vehicle 54b to identify vehicles in the neighboring lanes, their speed and relative location and provide SCW to the driver or to the vehicle control systems, according to the ADAS level of vehicle 54b. For example, if the driver of vehicle 54b wishes to bypass vehicles ahead.

Of course, the same applies to vehicles 54a and 54c, with respect to vehicle 54b. As mentioned above, the proposed system and smart infrastructure is adapted to collaborate with "Connected Vehicles" which provide a major improvement in road safety. By broadcasting Basic Safety Messages (BSM) using Dedicated Short-Range Communications (DSRC) all connected vehicles will have situational awareness of other connected vehicles in the area near them, as well as the capability to provide warning regarding impending collisions.

The Intelligent Transportation Systems Joint Program Office (ITSJPO) of the US Department of Transportation (USDOT) continues to be committed to the use of dedicated short-range communication (DSRC) for active safety applications using vehicle-to-vehicle (V2V) and/or vehicle-to-infrastructure (V2I) due to its designated licensed bandwidth, fast network acquisition, and low latency.

To take full advantage of the potential safety benefits of connected vehicle technology, relative trajectories of the surrounding vehicles with lane-level resolution are needed in addition to V2V communication.

Accurate positioning information with lane-level resolution can enable many vehicular safety applications (e.g., freeway merge-assist, lane-change-assist, and lane-departure warning systems), which could potentially help avoid many crashes.

Most of today's automated vehicle location (AVL) systems use Global Positioning System (GPS) technology, which can provide position information with an accuracy of approximately 15 m. Recently, low-cost Differential GPS (DGPS) receivers, which have a positioning accuracy of approximate 2-3 m.

These systems cannot rely on GNSS location data (GNSS stands for Global Navigation Satellite System and is the standard generic term for satellite navigation systems that provide autonomous geo-spatial positioning with global coverage. Common GNSS Systems are GPS, GLONASS, Galileo, Beidou and other regional systems) because of the following main reasons:

Accuracy

Global Positioning System (GPS) technology, cannot provide position information with the desired accuracy. Recently, low-cost Differential GPS (DGPS) receivers was developed, which have a positioning accuracy of approximate 2-3 m. However, this accuracy is not always sufficient to determine along which lane the vehicle is actually moving.

Ubiquitousness

Modern infrastructure, such as dense urban areas and underground tunnels, can effectively block all GPS signals, which implies that effective position triangulation will not be achieved.

Figure 19:
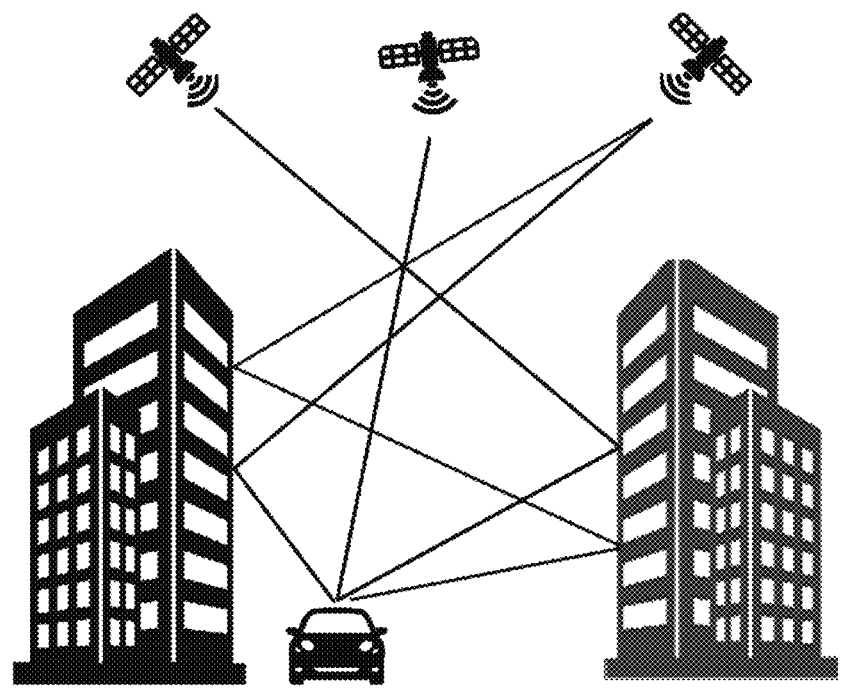
FIG. 19 illustrates a situation of bounced GPS signals with no LoS.

GPS by design expects a clear Line of Sight (LoS) to four or more satellites for accuracy. City roads are often surrounded by buildings. These structures create areas which are isolated from sky views. Intelligent Transportation System (ITS) researchers have called these areas "urban canyons". Buildings may block and/or bounce satellite signals, which can cause receivers to 'see' these signals either directly, indirectly, or both direct and indirect signals at the same time—which is the so-called multipath problem. FIG. 19 illustrates a situation of bounced GPS signals with no LoS.

Acquisition Time

"Time to First Fix" (TTFF) is a measure of the time required for a GPS receiver to acquire satellite signals and navigation data and calculate a position solution.

The TTFF is commonly broken down into three more specific scenarios:

Cold or Factory: The receiver is missing, or has inaccurate estimates of, its position, velocity, the time, or the visibility of any of the GPS satellites. As such, the receiver must systematically search for all possible satellites. After acquiring a satellite signal, the receiver can begin to obtain approximate information on all the other satellites, called the almanac. This almanac is transmitted repeatedly over 12.5 minutes. Almanac data can be received from any of the GPS satellites and is considered valid for up to 180 days. Manufacturers typically claim the factory TTFF to be 15 minutes.

Warm or Normal: The receiver has estimates of the current time within 20 seconds, the current position within 100 kilometers, and its velocity within 25 m/s, and it has valid almanac data. It must acquire each satellite signal and obtain that satellite's detailed orbital information, called ephemeris data. Each satellite broadcasts its ephemeris data every 30 seconds and is valid for up to four hours.

Hot or standby: The receiver has valid time, position, almanac, and ephemeris data, enabling a rapid acquisition of satellite signals. The time required of a receiver in this state to calculate a position fix may also be termed Time to Subsequent Fix (TTSF).

Figure 20:
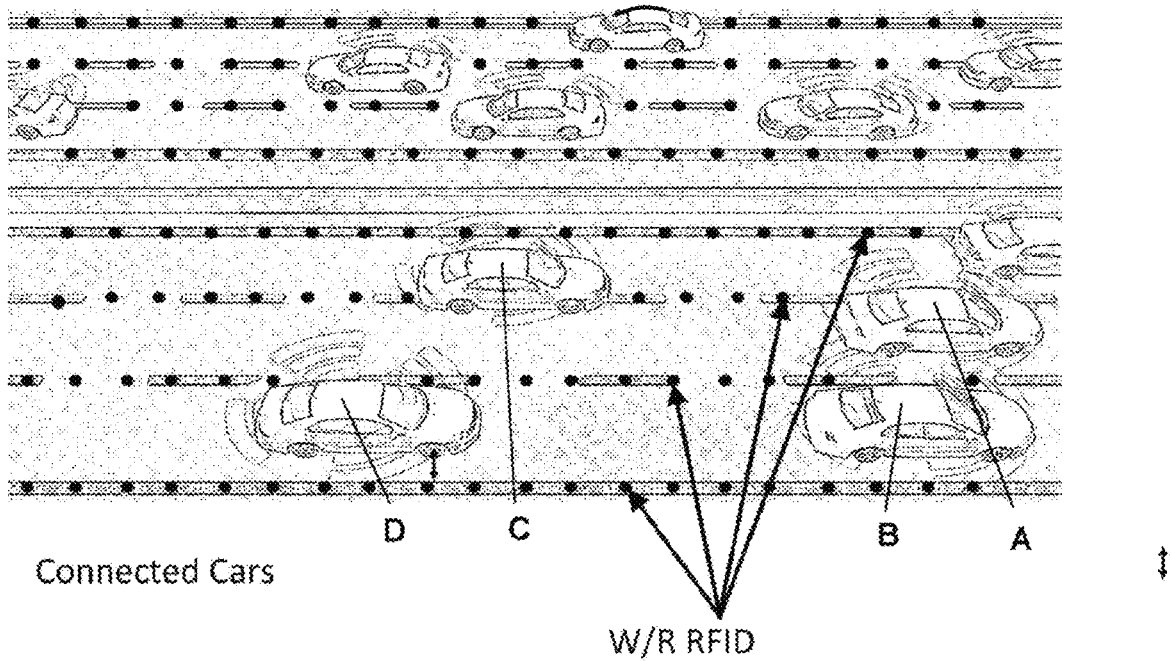
FIG. 20 illustrates an example of Connected Vehicles (V2V)

In the proposed system, the provisioning information with lane level resolution, is accurately and instantaneously provided, thereby enabling to take full advantage of connected cars, by transmitting data to neighboring cars. FIG. 20 illustrates an example of Connected Vehicles (V2V). The exact Location (including lane number and distance from lane border) and instantaneous speed is transmitted to adjacent cars. In this example, Car A is constantly aware of cars B, C and D.

Figure 21:
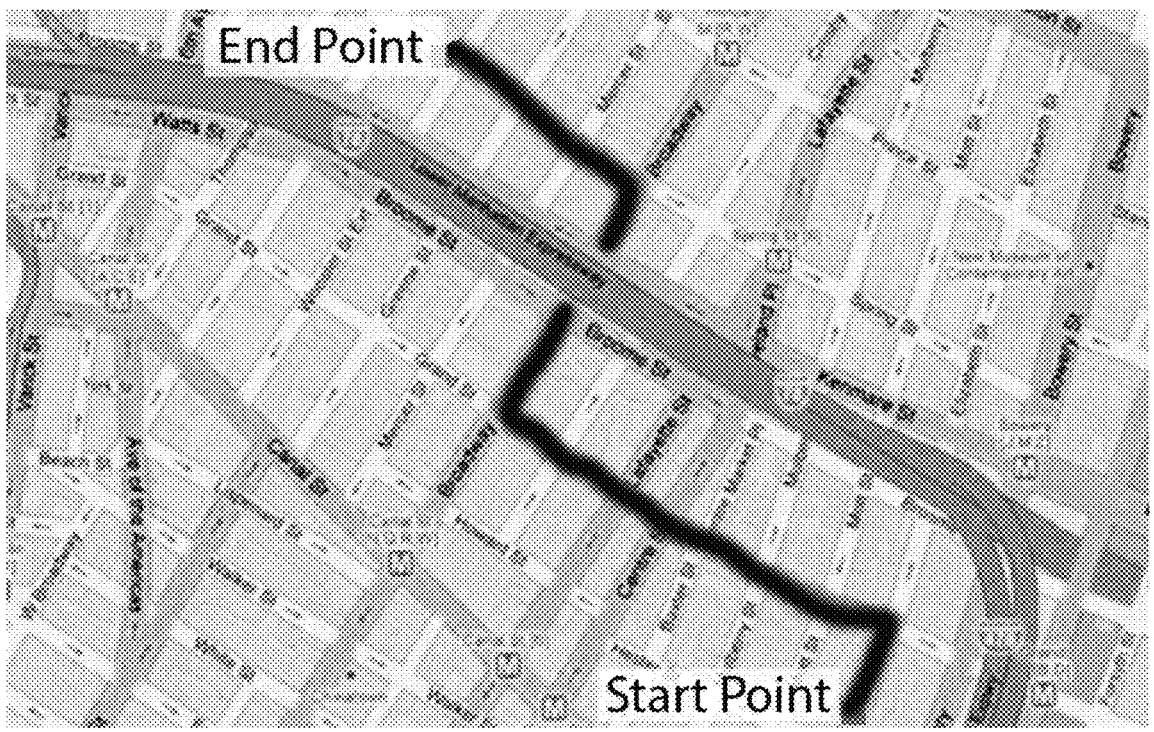
FIG. 21 shows another case of implementation related to Point to Point Transportation.

FIG. 21 shows another case of implementation related to Point to Point Transportation, which is more suitable to be applied within shorter terms (thereby overcoming regulatory delays). It can serve public transportation or special cases of trucks traveling in a repeatable route. In this case, only a dedicated route is adopted to the proposed system and only vehicles intended to drive autonomously along this route are equipped with the required means. In this scenario, the vehicle enters the autonomous mode at the "start point" and autonomously drive along the route until the "end point", where it returns back to nonautonomous mode.

Whenever an RFID tag is interrogated by a reader of a vehicle passing said RFID tag, said tag stores a timestamp representing the time said vehicle passed said RFID tag, in a predetermined section in its memory, for allowing a dedicated vehicle having a reader to collect all timestamps from said section, for future analysis. Such a future analysis includes identifying traffic congestions in road segments along with their timing, counting the total number of vehicles travelling along road segments over any desired time period. The analyzed data may help agencies to better plan and allocate future resources, and data for performing road maintenance operations.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:

1. A system for providing smart road infrastructure for the purpose of vehicle safety and autonomous driving, comprising:
   a) a plurality of road units, which are located along the borders of each traffic lane and equally spaced from each other,
   where each road unit includes:
      a.1) a read/write passive RFID tag operating at a predetermined frequency;
      a.2) antenna for communicating with a plurality of transceivers, each of which is installed on each vehicle that travels along a traffic lane of said road, in response to signals transmitted from said transceivers;
      a.3) a memory for temporarily storing data regarding each vehicle traveling along said lane and along adjacent lanes;
   b) at least one car unit that is installed in any vehicle travelling along a lane, where each car unit comprises:
      b.1) an electromagnetic reader for interrogating said tags at a pre-determined rate, said reader receives, from said tags, data regarding the movement parameters of a vehicle that previously passed said tags along the current lane, or vehicles in adjacent lanes that previously passed said tags, and writes data regarding the movement parameters of a vehicle that is currently passing said tags, into corresponding sections of the memory of said tags, said reader includes a first transceiver that is installed on the left front of said vehicle and a second transceiver that is installed on the right front of said vehicle; and
      b.2) a processor being in bidirectional data communication with said transceivers and with the vehicle inherent control systems, for processing data received from said tags and calculating speed and location of said vehicle with respect to the borders of said lane and to other neighboring vehicles traveling along said lane and along adjacent lanes, to provide alerts to the driver, or to intervene in the operations of the control systems of said vehicle, or to take over control of said vehicle.

2. A system according to claim 1, which is further adapted to communicate with additional vehicle safety systems, to alert the driver visually and/or audibly, regarding potential safety problems and/or taking over control of the vehicle using the vehicle's inherent control systems, for avoiding collisions and implementing a required Advanced Driver Assistance Systems (ADAS) level.

3. A system according to claim 1, in which the safety operations include one or more of the following:
   Lane Departure Warning (LDW);
   Forward Collision Warning (FCW);
   Automatic Emergency Braking (AEB);
   Adaptive Cruise Control (ACC);
   Lane Keeping Assist (LKA);
   Lane Centering (LC);
   Traffic Jam Assist (TJA);
   Side Collision Warning (SCW).

4. A system according to claim 1, in which the read/write passive RF tag is implemented as a micro-chip with a protective cap.

5. A system according to claim 1, in which the antenna is a quarter wavelength that corresponds to the operating frequency.

6. A system according to claim 1, in which the antenna is a sharpened metal rod that is nailed into the infrastructure of the lane borders, using pneumatic force applied by a pneumatic nail gun, while moving.

7. A system according to claim 1, in which the processor is further adapted to provide accurate location information ubiquitously and instantaneously without acquisition time, with lane-level resolution in addition to other essential data to vehicles, equipped with autonomous and "Connected Vehicles" system.

8. A system according to claim 1, in which the transceivers communicate with the RF tags via directional antennas implemented as phased array.

9. A system according to claim 1, in which the processor is further adapted to provide accurate acceleration or deceleration information to an ADAS system.

10. A system according to claim 1, in which the distance between adjacent tags is different in highways and urban roads.

11. A system according to claim 1, in which the instantaneous speed is calculated by determining the time elapsed between receiving signal power peaks from two consecutive tags and from the known distance between said adjacent tags.

12. A system according to claim 1, in which the time elapsed between receiving signals from two adjacent tags is the time between receiving two subsequent power peaks of predetermined digital words.

13. A system according to claim 1, in which the calculated speed and the acceleration or deceleration along with the real timing and the vehicle length are written into the tag by the transceiver of the car that passes said tag.

14. A system according to claim 1, in which each time the vehicle behind passes a tag, the distance from the vehicle ahead being the distance from the front of the car to rear of the vehicle ahead, the current speed and changes in the vehicle's speed, are calculated, for providing Forward Collision Warning (FCW).

15. A system according to claim 1, in which departure from the center of the lane of a vehicle is calculated as a function of the difference between average power strength of the right and left boundaries along n samples, for providing Lane Keeping Assist (LKA) and Lane Centering (LC).

16. A system according to claim 1, in which whenever the left electromagnetic reader passes a predetermined number of left-sided tags with insufficient reception levels, or stops receiving signals from the left-sided tags and starts receiving the left-sided tags of the left adjacent lane, or whenever the right electromagnetic reader passes a predetermined number of right-sided tags with insufficient reception levels, or stops receiving signals from the right-sided tags and starts receiving the right-sided tags of the right adjacent lane, the car processor determines that the vehicle departs from the current lane, and a Lane Departure Warning (LDW) signal is sent to the driver and to the ADAS system of the vehicle.

17. A system according to claim 1, in which the plurality of road units, which are deployed along the borders of a dedicated route, along which vehicles equipped with the required means, are intended to drive autonomously, where said vehicles enter the autonomous mode at the "start point" and autonomously drive along the route until reaching the "end point", where it returns back to non-autonomous mode.

18. A system according to claim 1, in which whenever an RFID tag is interrogated by a reader of a vehicle passing said RFID tag, said tag stores a timestamp representing the time said vehicle passed said RFID tag, in a predetermined section in its memory, for allowing a dedicated vehicle having a reader to collect all timestamps from said section, for future analysis.

19. A system according to claim 18, in which future analysis includes:
- identifying traffic congestions in road segments along with their timing;
- counting the total number of vehicles travelling along road segments over any desired time period;
- help agencies to better plan and allocate future resources;
- data for performing maintenance operations.

* * * * *